United States Patent
Tien et al.

(10) Patent No.: US 11,402,702 B2
(45) Date of Patent: Aug. 2, 2022

(54) DISPLAY APPARATUS

(71) Applicant: Au Optronics Corporation, Hsinchu (TW)

(72) Inventors: Kun-Cheng Tien, Hsinchu (TW); Chien-Huang Liao, Hsinchu (TW); Cian-Rou Wu, Hsinchu (TW); Chin-An Lin, Hsinchu (TW); Wei-Cheng Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/924,223

(22) Filed: Jul. 9, 2020

(65) Prior Publication Data

US 2021/0271138 A1 Sep. 2, 2021

(30) Foreign Application Priority Data

Mar. 2, 2020 (TW) ................ 109106706

(51) Int. Cl.
*G02F 1/1343* (2006.01)
*G02F 1/13* (2006.01)
*G02F 1/1333* (2006.01)

(52) U.S. Cl.
CPC ...... *G02F 1/134363* (2013.01); *G02F 1/1323* (2013.01); *G02F 1/133345* (2013.01)

(58) Field of Classification Search
CPC ......... G02F 1/134363; G02F 1/134381; G02F 1/134372; G02F 1/1323; G02F 1/133531; G02F 1/133528
See application file for complete search history.

(56) References Cited

U.S. PATENT DOCUMENTS

| | | |
|---|---|---|
| 10,216,017 B2 | 2/2019 | Chang et al. |
| 10,627,670 B2 | 4/2020 | Robinson et al. |
| 10,712,608 B2 | 7/2020 | Robinson et al. |
| 2015/0219911 A1* | 8/2015 | Cho ............... G02B 30/27 349/15 |
| 2017/0269441 A1* | 9/2017 | Murata .......... G02F 1/13439 |
| 2018/0052342 A1* | 2/2018 | Chang ............ G02F 1/1323 |
| 2019/0250458 A1 | 8/2019 | Robinson et al. |
| 2020/0026125 A1 | 1/2020 | Robinson et al. |
| 2020/0041839 A1 | 2/2020 | Robinson et al. |

FOREIGN PATENT DOCUMENTS

| | | |
|---|---|---|
| CN | 104020615 | 9/2014 |
| TW | I596402 | 8/2017 |
| TW | I597551 | 9/2017 |
| TW | 201932927 | 8/2019 |

* cited by examiner

*Primary Examiner* — Angela K Davison
(74) *Attorney, Agent, or Firm* — JCIPRNET (57) ABSTRACT

A display apparatus includes a display panel and a switching panel disposed outside the display panel. The switching panel includes a first base, a first electrode, a second electrode, a second base, a third electrode, a fourth electrode and a liquid crystal layer. The first electrode and the second electrode are disposed on the first base. The first electrode has branches, and the branches of the first electrode are arranged in a first direction. The second base is disposed opposite to the first base. The third electrode and the fourth electrode are disposed on the second base. The third electrode has branches, and the branches of the third electrode are arranged in a second direction, and the first direction is interlaced with the second direction. The liquid crystal layer is disposed between the first base and the second base.

9 Claims, 11 Drawing Sheets

DISPLAY APPARATUS

CROSS-REFERENCE TO RELATED APPLICATION

This application claims the priority benefit of Taiwan application serial no. 109106706, filed on Mar. 2, 2020. The entirety of the above-mentioned patent application is hereby incorporated by reference herein and made a part of this specification.

BACKGROUND

Technical Field

The invention relates to an optoelectronic apparatus, and particularly relates to a display apparatus.

Description of Related Art

Display apparatuses nowadays feature lightness, thinness, and compactness as well as low energy consumption, and have been broadly applied in various electronic products, such as TVs, desktop PCs, smart phones, notebooks, tablet PCs, etc. Owing to the development of display technologies and the attention of the public to privacy, anti-peeping technologies draw more and more attention, and researchers have been putting efforts into the development of anti-peeping technologies. In general, once a display apparatus is manufactured, the anti-peeping direction of the display apparatus is set. However, as the occasion and/or manner of use differs, the user may need a different anti-peeping direction to protect his/her privacy.

SUMMARY

Embodiments of the invention provide a display apparatus whose anti-peeping direction can be changed.

A display apparatus according to an embodiment of the invention includes a display panel and a switching panel disposed outside the display panel. The switching panel includes a first base, a first electrode, a second electrode, a second base, a third electrode, a fourth electrode and a liquid crystal layer. The first electrode and the second electrode are disposed on the first base. The first electrode has branches, and the branches of the first electrode are arranged in a first direction. The second base is disposed opposite to the first base. The third electrode and the fourth electrode are disposed on the second base. The third electrode has branches, and the branches of the third electrode are arranged in a second direction, and the first direction is interlaced with the second direction. The liquid crystal layer is disposed between the first base and the second base.

According to an embodiment of the invention, when the display apparatus is under a first anti-peeping mode, a potential difference between the first electrode and the second electrode is greater than a potential difference between the third electrode and the second electrode and a potential difference between the fourth electrode and the second electrode, or when the display apparatus is under the first anti-peeping mode, a potential difference is present between the first electrode and the second electrode, and the third electrode and the fourth electrode are floating.

According to an embodiment, when the display apparatus is under a second anti-peeping mode, a potential difference between the third electrode and the fourth electrode is greater than a potential difference between the first electrode and the fourth electrode and a potential difference between the second electrode and the fourth electrode.

According to an embodiment of the invention, when the display apparatus is under a second anti-peeping mode, a potential difference is present between the third electrode and the fourth electrode, and the first electrode and the second electrode are floating.

According to an embodiment of the invention, when the display apparatus is under a sharing mode, the first electrode, the second electrode, the third electrode, and the fourth electrode are not turned on, and long axes of a plurality of liquid crystal molecules of the liquid crystal layer are substantially perpendicular to the first base.

According to an embodiment of the invention, the second electrode has a plurality of branches, and the branches of the first electrode and the branches of the second electrode are alternately arranged in the first direction.

According to an embodiment of the invention, the fourth electrode has a plurality of branches, and the branches of the third electrode and the branches of the fourth electrode are alternately arranged in the second direction.

According to an embodiment of the invention, the switching panel further includes a first insulating layer. The first insulating layer is disposed between the first electrode and the second electrode. The second electrode is disposed between the first base and the first insulating layer. The first electrode is disposed between the first insulating layer and the liquid crystal layer. The second electrode is a complete electrode layer and overlapped with the branches of the first electrode and at least one gap between the branches of the first electrode.

According to an embodiment of the invention, the switching panel further includes a second insulating layer. The second insulating layer is disposed between the third electrode and the fourth electrode. The fourth electrode is disposed between the second base and the second insulating layer. The third electrode is disposed between the second insulating layer and the liquid crystal layer. The fourth electrode is a complete electrode layer and overlapped with the branches of the third electrode and at least one gap between the branches of the third electrode.

According to an embodiment of the invention, one of the branches of the first electrode and one of the branches of the third electrode form an included angle $\theta$, and $80° \leq \theta \leq 100°$.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

It should be understood that, when an element such as a layer, a film, a region, or a substrate is described as being "located on" or "connected with" another element, such element may be directly arranged on the another element or connected with the another element, or an intermediate element may be present therebetween. On the contrary, when the element is described as "directly located on another element" or "directly connected with" another element, no intermediate element is present therebetween. The term "connect" as described herein may refer to physical and/or electrical connection. In addition, the term "electrically connected" or "coupled" includes the situation where another element is present between two elements.

Terms such as "about", "approximately", or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For example, "about" may mean within one or more standard deviations, for example, ±30%, ±20%, ±10%, or ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the invention and will not be interpreted in an idealized or overly formal sense unless expressly so defined herein.

Figure 1:
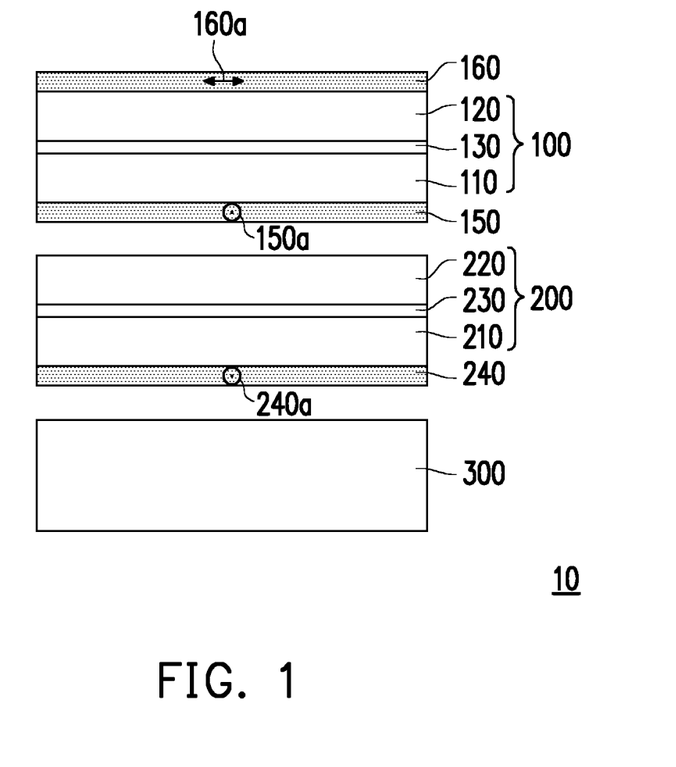
FIG. 1 is a schematic cross-sectional view illustrating a display apparatus 10 according to an embodiment of the invention.

FIG. 1 is a schematic cross-sectional view illustrating a display apparatus 10 according to an embodiment of the invention.

Referring to FIG. 1, a display apparatus 10 includes a display panel 100. The display panel 100 includes a pixel array substrate 110, an opposite substrate 120, and a display medium 130 disposed between the pixel array substrate 110 and the opposite substrate 120. In the embodiment, the pixel array substrate 110 includes a plurality of pixel structures (not shown), and each pixel structure has an active device (not shown) and a pixel electrode (not shown) electrically connected with the active device. However, the invention is not limited thereto.

The display apparatus 10 further includes a switching panel 200 disposed outside the display panel 100. For example, in the embodiment, the display medium 130 of the display panel 100 may be a non-emissive display medium (including, but is not limited to, liquid crystal), and the display apparatus 10 may further include a backlight module 300 (including, but is not limited to, a collimated backlight). The backlight module 300 is disposed below the display panel 100, and the switching panel 200 may be optionally disposed between the backlight module 300 and the display panel 100. However, the invention is not limited thereto. In other embodiments, the switching panel 200 may also be disposed in another position, and the display medium 130 is not limited to a non-emissive display medium. In the subsequent paragraphs, details will be described with reference to other drawings.

Figure 2:
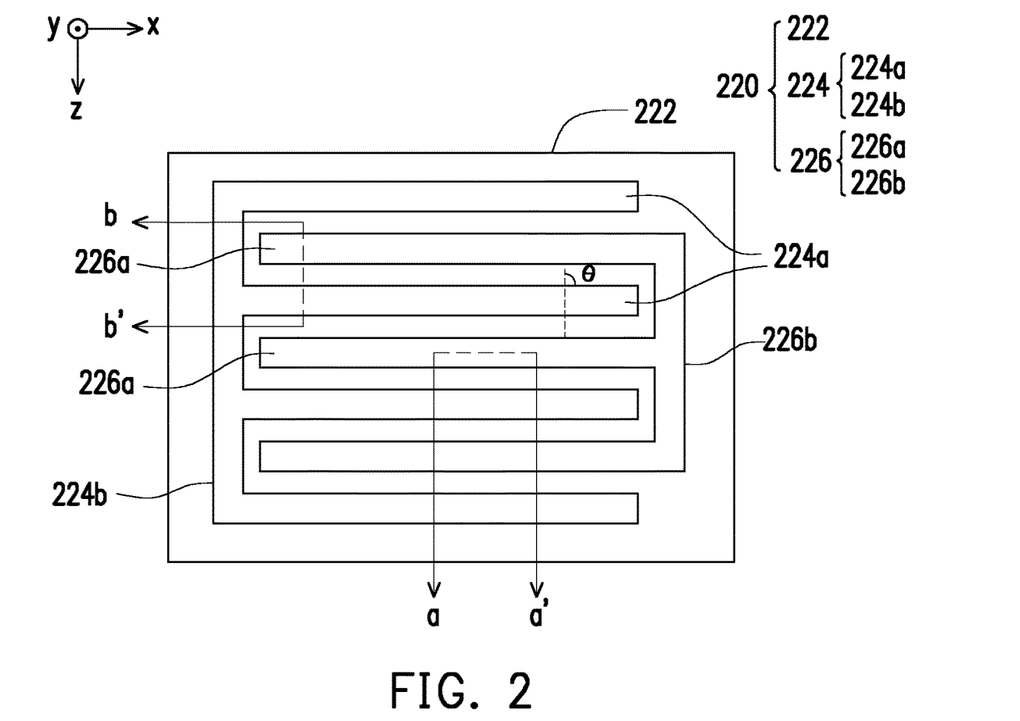
FIG. 2 is a schematic bottom view illustrating a second substrate 220 of a switching panel 200 according to an embodiment of the invention.

FIG. 2 is a schematic bottom view illustrating a second substrate 220 of a switching panel 200 according to an embodiment of the invention.

Figure 3:
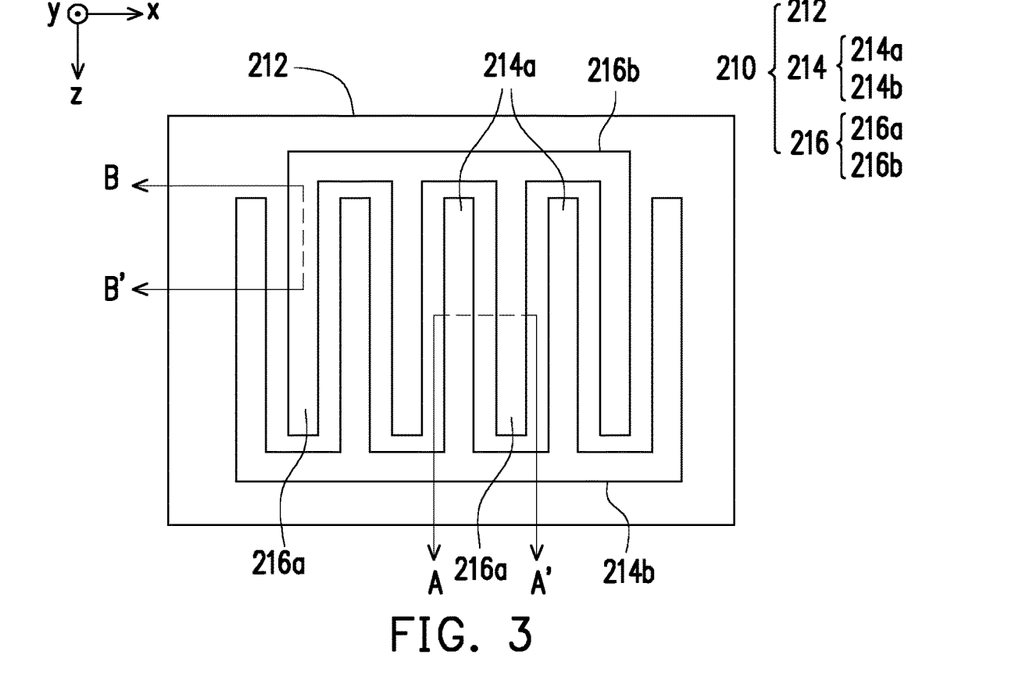
FIG. 3 is a schematic top view illustrating a first substrate 210 of the switching panel 200 according to an embodiment of the invention.

FIG. 3 is a schematic top view illustrating a first substrate 210 of the switching panel 200 according to an embodiment of the invention.

Figure 4:
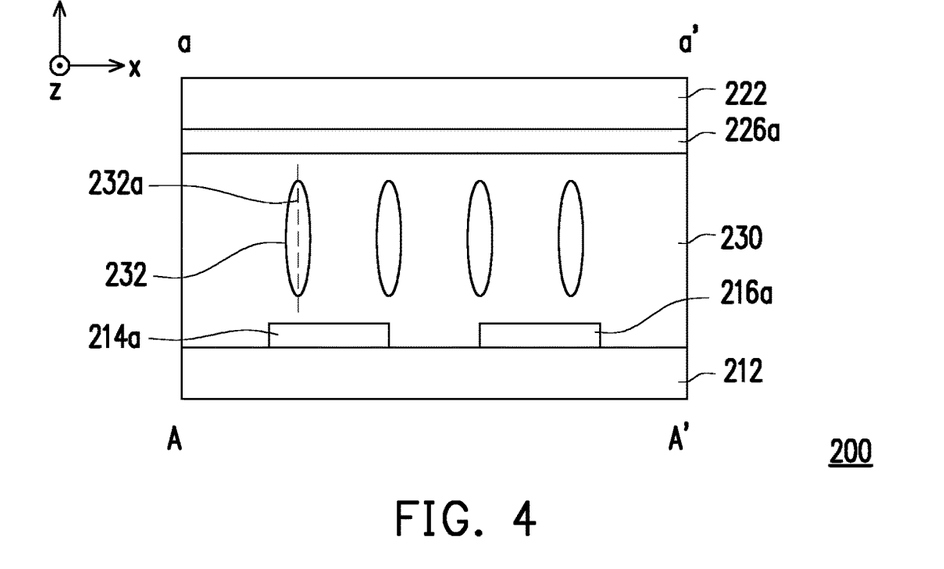
FIG. 4 is a schematic cross-sectional view illustrating the switching panel 200 according to an embodiment of the invention.

FIG. 4 is a schematic cross-sectional view illustrating the switching panel 200 according to an embodiment of the invention. FIG. 4 corresponds to a cross-sectional line a-a' of FIG. 2 and a cross-sectional line A-A' of FIG. 3. In particular, FIG. 4 illustrates the state of the switching panel 200 when the display apparatus 10 is under the sharing mode.

Figure 5:
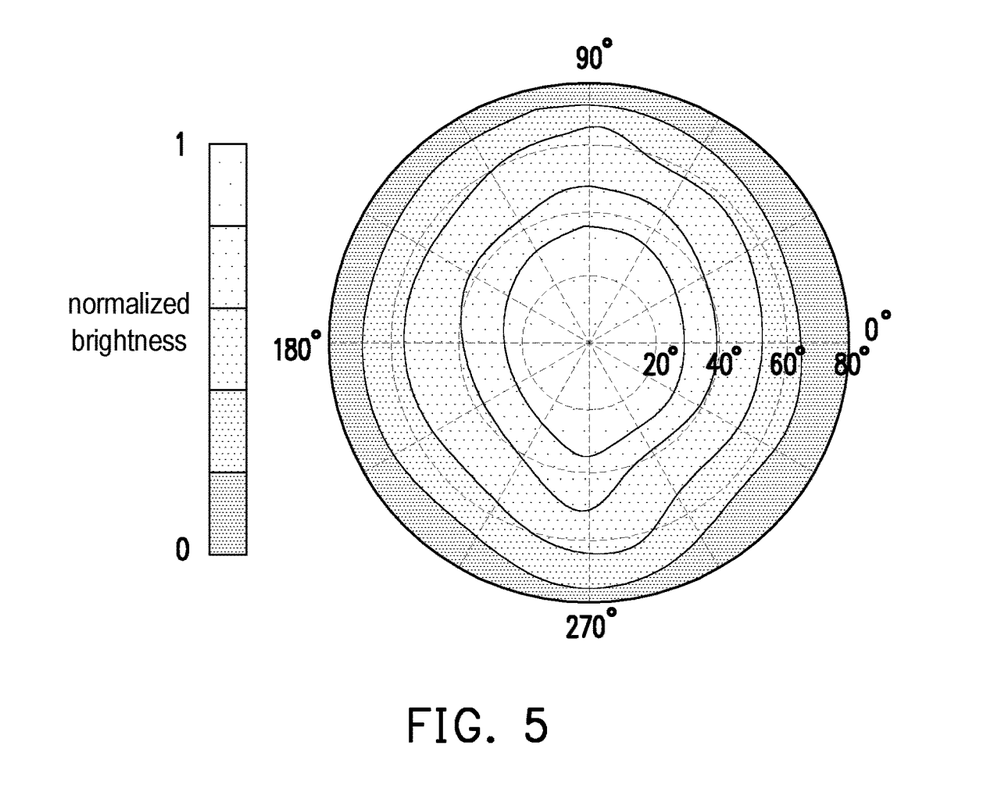
FIG. 5 is a diagram illustrating a relationship between each viewing angle of the display apparatus 10 under a sharing mode and normalized brightness.

FIG. 5 is a diagram illustrating a relationship between each viewing angle of the display apparatus 10 under a sharing mode and normalized brightness.

Figure 6:
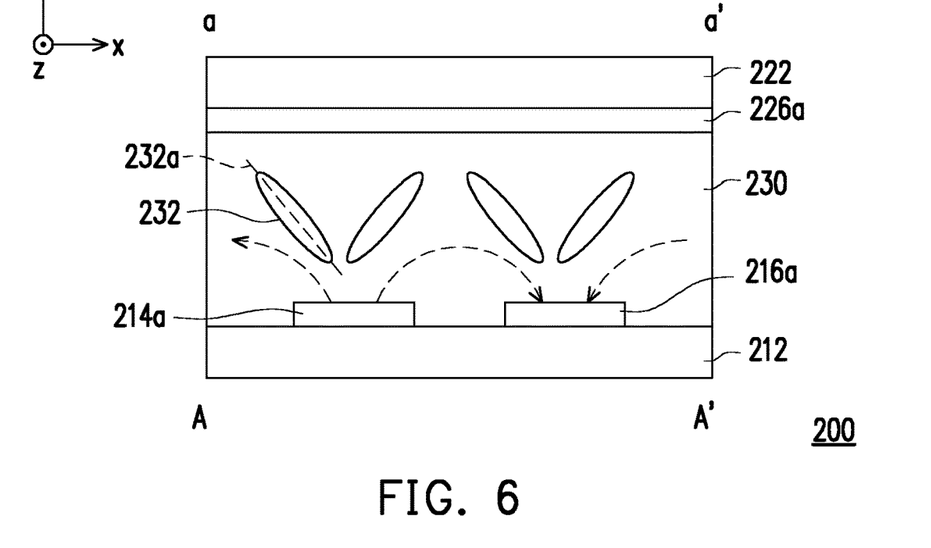
FIG. 6 is a schematic cross-sectional view illustrating the switching panel 200 according to an embodiment of the invention.

FIG. 6 is a schematic cross-sectional view illustrating the switching panel 200 according to an embodiment of the invention. FIG. 6 corresponds to a cross-sectional line a-a' of FIG. 2 and a cross-sectional line A-A' of FIG. 3. In particular, FIG. 6 illustrates the state of the switching panel 200 when the display apparatus 10 is under the first anti-peeping mode.

Figure 7:
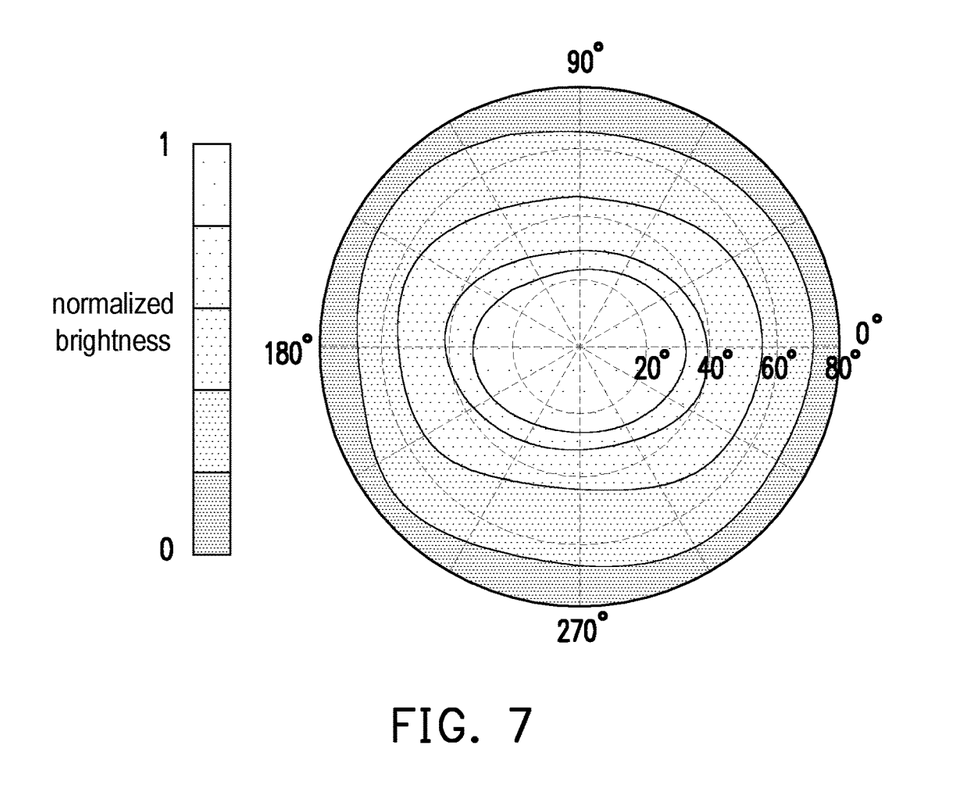
FIG. 7 is a diagram illustrating a relationship between each viewing angle of the display apparatus 10 under a first anti-peeping mode and normalized brightness.

FIG. 7 is a diagram illustrating a relationship between each viewing angle of the display apparatus 10 under a first anti-peeping mode and normalized brightness.

Figure 8:
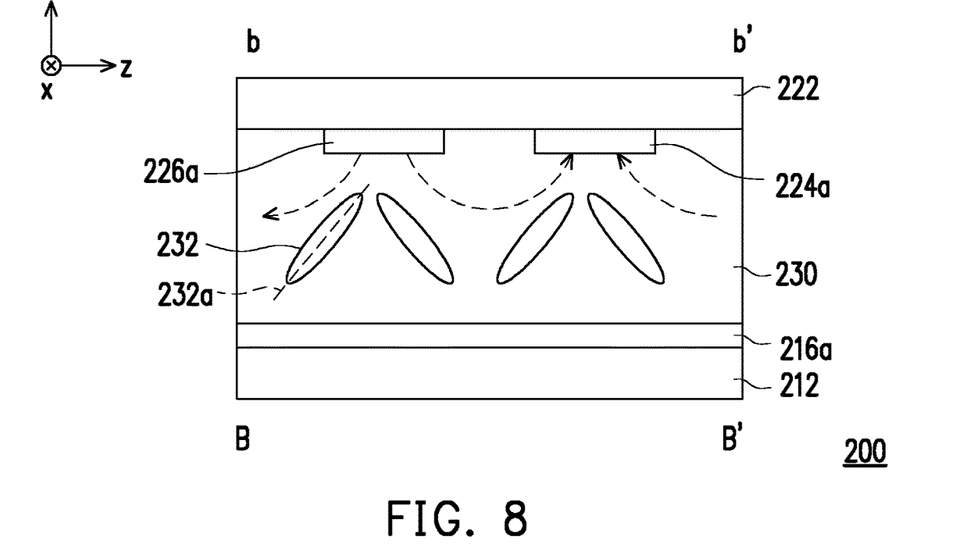
FIG. 8 is a schematic cross-sectional view illustrating the switching panel 200 according to an embodiment of the invention.

FIG. 8 is a schematic cross-sectional view illustrating the switching panel 200 according to an embodiment of the invention. FIG. 8 corresponds to a cross-sectional line b-b' of FIG. 2 and a cross-sectional line B-B' of FIG. 3. In particular, FIG. 8 illustrates the state of the switching panel 200 when the display apparatus 10 is under the second anti-peeping mode.

Figure 9:
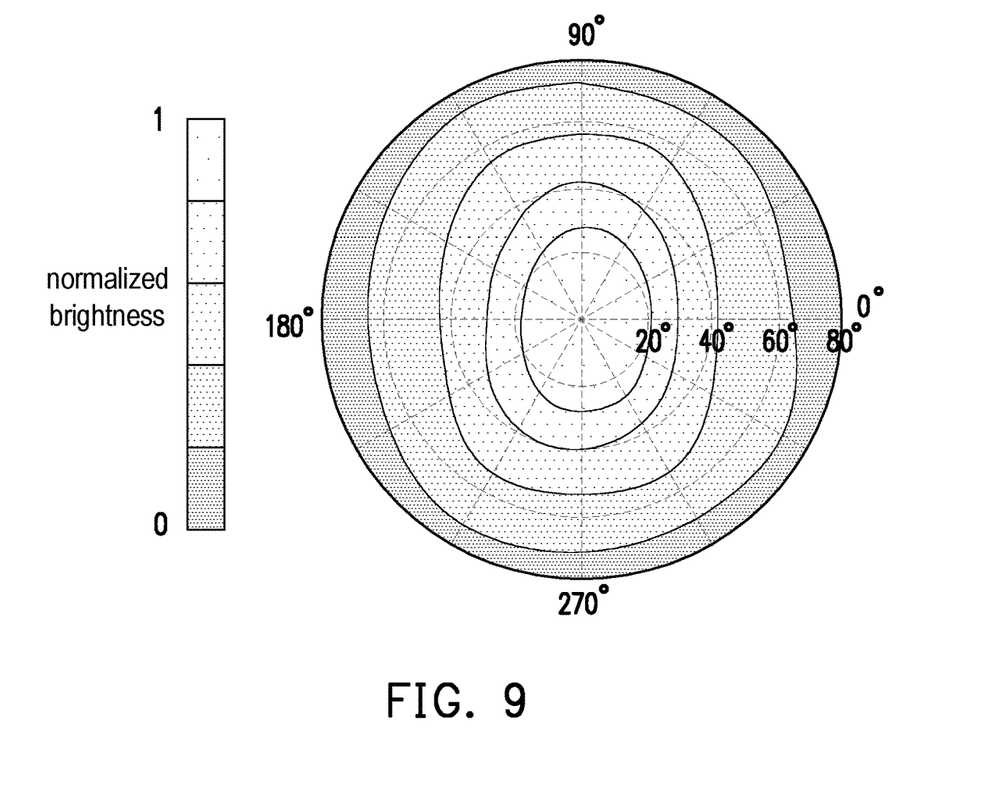
FIG. 9 is a diagram illustrating a relationship between each viewing angle of the display apparatus 10 under a second anti-peeping mode and normalized brightness.

FIG. 9 is a diagram illustrating a relationship between each viewing angle of the display apparatus 10 under a second anti-peeping mode and normalized brightness.

For clear illustration, FIGS. 2, 3, 4, 6, and 8 illustrate a first direction x, a second direction z, and a third direction y perpendicular to one another.

Referring to FIGS. 1, 2, 3, and 4, the switching panel 200 includes the first substrate 210, the second substrate 220, and a liquid crystal layer 230. The liquid crystal layer 230 is disposed between the first substrate 210 and the second substrate 220. For example, in the embodiment, a liquid crystal molecule 232 of the liquid crystal layer 230 may be optionally a negative liquid crystal molecule. However, the invention is not limited thereto.

Referring to FIGS. 3 and 4, the first substrate 210 has a first base 212 and a first electrode 214 and a second electrode 216 disposed on the first base 212. The first electrode 214 has a plurality of branches 214a, and the branches 214a of the first electrode 214 are arranged in the first direction x. In the embodiment, the second electrode 216 may optionally have a plurality of branches 216a, and the branches 214a of the first electrode 214 and the branches 216a of the second electrode 216 may be alternately arranged in the first direction x.

In addition, in the embodiment, the first electrode 214 and the second electrode 216 respectively have a connection part 214b and a connection part 216b. A plurality of ends of the branches 214a of the first electrode 214 may be electrically connected with the connection part 214b of the first electrode 214. A plurality of ends of the branches 216a of the second electrode 216 may be electrically connected with the connection part 216b of the second electrode 216. In addition, the connection part 214b of the first electrode 214 and the connection part 216b of the second electrode 216 may be respectively located on opposite two sides of the branches 214a of the first electrode 214 and the branches 216a of the second electrode 216.

In brief, in the embodiment, the first electrode 214 and the second electrode 216 of the first substrate 210 may be substantially finger-shaped. However, the invention is not limited thereto. In other embodiments, the first electrode 214 and/or the second electrode 216 of the first substrate 210 may also be in another shape.

In the embodiment, the branches 214a of the first electrode 214 of the first substrate 210 and the branches 216a of the second electrode 216 of the first substrate 210 may be formed by the same conductive layer and substantially located on the same plane, and the first substrate 210 may use the In-plane Switching (IPS) mode to drive the liquid crystal layer 230 of the switching panel 200. However, the invention is not limited thereto.

In the embodiment, the first base 212, the first electrode 214, and the second electrode 216 of the first substrate 210 are all light transmissive. For example, in the embodiment, the material of the first base 212 may include glass, quartz, an organic polymer, or other suitable materials; the first electrode 214 and/or the second electrode 216 may include a metal oxide, such as indium tin oxide, indium zinc oxide, aluminum tin oxide, aluminum zinc oxide, indium germanium zinc oxide, other suitable oxides, or a stacked layer of at least two of the aforementioned. However, the invention is not limited thereto.

Referring to FIGS. 2 and 4, the second substrate 220 has a second base 222 and a third electrode 224 and a fourth electrode 226 disposed on the second base 222. The third electrode 224 has a plurality of branches 224a, the branches 224a of the third electrode 224 are arranged in the second direction z, and the first direction x is interlaced with the second direction z. That is, as shown in FIGS. 2 and 3, one of the branches 214a of the first electrode 214 is interlaced with one of the branches 224a of the third electrode 224 and forms an included angle θ with the branch 224a of the third electrode 224. For example, in the embodiment, $80°≤θ≤100°$, and it may also be that $θ=90°$. However, the invention is not limited thereto.

Referring to FIGS. 2 and 4, in the embodiment, the fourth electrode 226 may optionally have a plurality of branches 226a, and the branches 224a of the third electrode 224 and the branches 226a of the fourth electrode 226 may be alternately arranged in the second direction z. However, the invention is not limited thereto.

In addition, in the embodiment, the third electrode 224 and the fourth electrode 226 respectively have a connection part 224b and a connection part 226b. A plurality of ends of the branches 224a of the third electrode 224 may be electrically connected with the connection part 224b of the third electrode 224. A plurality of ends of the branches 226a of the fourth electrode 226 may be electrically connected with the connection part 226b of the fourth electrode 226. In addition, the connection part 224b of the third electrode 224 and the connection part 226b of the fourth electrode 226 may be respectively located on opposite two sides of the branches 224a of the third electrode 224 and the branches 226a of the fourth electrode 226.

In brief, in the embodiment, the third electrode 224 and the fourth electrode 226 of the second substrate 220 may be substantially finger-shaped. However, the invention is not limited thereto. In other embodiments, the third electrode 224 and/or the fourth electrode 226 of the second substrate 220 may also be in another shape.

In the embodiment, the branches 224a of the third electrode 224 of the second substrate 220 and the branches 226a of the fourth electrode 226 of the second substrate 220 may be formed by the same conductive layer and substantially located on the same plane, and the second substrate 220 may use the In-plane Switching (IPS) mode to drive the liquid crystal layer 230 of the switching panel 200. However, the invention is not limited thereto.

In the embodiment, the second base 222, the third electrode 224, and the fourth electrode 226 of the second substrate 220 are all light transmissive. For example, in the embodiment, the material of the second base 222 may include glass, quartz, an organic polymer, or other suitable materials; the third electrode 224 and/or the fourth electrode 226 may include a metal oxide, such as indium tin oxide, indium zinc oxide, aluminum tin oxide, aluminum zinc oxide, indium germanium zinc oxide, other suitable oxides, or a stacked layer of at least two of the aforementioned. However, the invention is not limited thereto.

Referring to FIG. 1, the display apparatus 10 further includes a polarizer 150 and a polarizer 240. The polarizer 150 and the polarizer 240 are respectively disposed on opposite two sides of the liquid crystal layer 230 of the switching panel 200. The polarizer 150 is disposed between the liquid crystal layer 230 of the switching panel 200 and the display panel 100, and a transmission axis 150a of the polarizer 150 and a transmission axis 240a of the polarizer 240 are substantially parallel to each other.

In addition, in the embodiment, the display medium 130 of the display panel 100 may be an optical anisotropic material. For the purpose of display, in addition to the polarizer 150 being disposed on one side of the display panel 100, another polarizer 160 is also disposed on the other side of the display panel 100. The transmission axis 150a of the polarizer 150 is substantially perpendicular to a transmission axis 160a of the polarizer 160. However, the invention is not limited thereto.

Referring to FIGS. 1, 2, 3, 4, and 5, when the display apparatus 10 is under the sharing mode, the first electrode 214, the second electrode 216, the third electrode 224, and the fourth electrode 226 of the switching panel 200 are not turned on. In addition, long axes 232a of the liquid crystal molecules 232 of the liquid crystal layer 230 are substantially perpendicular to the first base 212. In other words, the liquid crystal molecule 232 of the switching panel 200 is vertically aligned.

When the display apparatus 10 is under the sharing mode, the long axes 232a of the liquid crystal molecules 232 of the liquid crystal layer 230 are substantially perpendicular to the first base 212, and light beams passing through the polarizer 240 along various directions are able to maintain the polarization states thereof after passing through the liquid crystal layer 230 of the switching panel 200. Therefore, the light beams are able to pass through the polarizer 150. Therefore, the user is able to view the displayed image formed on the display panel 100 from various viewing angles.

Referring to FIGS. 1, 2, 3, 6, and 7, when the display apparatus 10 is under the first anti-peeping mode, a potential difference is present between the first electrode 214 and the second electrode 216, and the potential difference between the first electrode 214 and the second electrode 216 is greater than a potential difference between the third electrode 224 and the second electrode 216 and a potential difference between the fourth electrode 226 and the second electrode 216. For example, in the embodiment, the first electrode 214 has an AC signal with an amplitude of 8V, the second electrode 216 has a DC signal of 0V, the third electrode 224 and the fourth electrode 226 have AC signals with an amplitude of 4V. Accordingly, the potential difference (e.g., 8V) between the first electrode 214 and the second electrode 216 is greater than the potential difference (e.g., 4V) between the third electrode 224 and the second electrode 216 and the potential difference (e.g., 4V) between the fourth electrode 226 and the second electrode 216. However, the invention is not limited thereto.

Alternatively, when the display apparatus 10 is under the first anti-peeping mode, a potential difference is present between the first electrode 214 and the second electrode 216, and the third electrode 224 and the fourth electrode 226 are floating. For example, in another embodiment, when the display apparatus 10 is under the first anti-peeping mode, the first electrode 214 has an AC signal with an amplitude of 8V, the second electrode 216 has a DC signal of 0V, a potential difference of 8V is present between the first electrode 214 and the second electrode 216, and the third electrode 224 and the fourth electrode 226 have a floating potential. However, the invention is not limited thereto.

When the display apparatus 10 is under the first anti-peeping mode, under the influence of the potential difference between the first electrode 214 and the second electrode 216 of the first substrate 210, the long axes 232a of the liquid crystal molecules 232 of the liquid crystal layer 230 are substantially inclined toward the horizontal direction (e.g., the first direction x shown in FIGS. 2 and 3 and the opposite direction of the first direction x), the polarization states of the light beams transmitted on the xy plane (i.e., the plane formed by the first direction x and the third direction y) substantially remain the same after passing through the polarizer 240 and the liquid crystal layer 230 in such state, most of the light beams are able to pass through the polarizer 150, and the display apparatus 10 substantially has no anti-peeping effect in the horizontal direction. Meanwhile, the polarization states of light beams transmitted on the yz plane (i.e., the plane formed by the third direction y and the second direction z) may be changed after passing through the polarizer 240 and the liquid crystal layer 230 in such state, and at least a portion of the light beams are blocked by the polarizer 150. Thus, the display apparatus 10 is capable of anti-peeping in the vertical direction (e.g., the second direction z shown in FIGS. 2 and 3 and the opposite direction of the second direction z). In other words, when the display apparatus 10 is under the first anti-peeping mode, the anti-peeping direction of the display apparatus 10 is a vertical direction.

Referring to FIGS. 1, 2, 3, 8, and 9, when the display apparatus 10 is under the second anti-peeping mode, the potential difference between the third electrode 224 and the fourth electrode 226 is greater than the potential difference between the first electrode 214 and the fourth electrode 226 and the potential difference between the second electrode 216 and the fourth electrode 226. For example, in the embodiment, when the display apparatus 10 is under the second anti-peeping mode, the third electrode 224 has an AC signal with an amplitude of 8V, the fourth electrode 226 has a DC signal of 0V, the first electrode 214 and the second electrode 216 have AC signals with an amplitude of 4V. Accordingly, the potential difference (e.g., 8V) between the third electrode 224 and the fourth electrode 226 is greater than the potential difference (e.g., 4V) between the first electrode 214 and the fourth electrode 226 and the potential difference (e.g., 4V) between the second electrode 216 and the fourth electrode 226. However, the invention is not limited thereto.

Alternatively, when the display apparatus 10 is under the second anti-peeping mode, a potential difference is present between the third electrode 224 and the fourth electrode 226, and the first electrode 214 and the second electrode 216 are floating. For example, in another embodiment, when the display apparatus 10 is under the second anti-peeping mode, the third electrode 224 has an AC signal with an amplitude of 8V, the fourth electrode 226 has a DC signal of 0V, a potential difference of 8V is present between the third electrode 224 and the fourth electrode 226, and the first electrode 214 and the second electrode 216 have a floating potential. However, the invention is not limited thereto.

When the display apparatus 10 is under the second anti-peeping mode, under the influence of the potential difference between the third electrode 224 and the fourth electrode 226 of the second substrate 220, the long axes 232a of the liquid crystal molecules 232 of the liquid crystal layer 230 are substantially inclined toward the vertical direction (e.g., the second direction z shown in FIGS. 2 and 3 and the opposite direction of the second direction z), the polarization states of the light beams transmitted on the yz plane (i.e., the plane formed by the third direction y and the second direction z) substantially remain the same after passing through the polarizer 240 and the liquid crystal layer 230 in such state, most of the light beams are able to pass through the polarizer 150, and the display apparatus 10 has no anti-peeping effect in the vertical direction. Meanwhile, the polarization states of light beams transmitted on the xy plane (i.e., the plane formed by the first direction x and the third direction y) may be changed after passing through the polarizer 240 and the liquid crystal layer 230 in such state, and at least a portion of the light beams are blocked by the polarizer 150. Thus, the display apparatus 10 is capable of anti-peeping in the horizontal direction (e.g., the first direction x shown in FIGS. 2 and 3 and the opposite direction of the first direction x). In other words, when the display apparatus 10 is under the second anti-peeping mode, the anti-peeping direction of the display apparatus 10 is a horizontal direction.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 10:
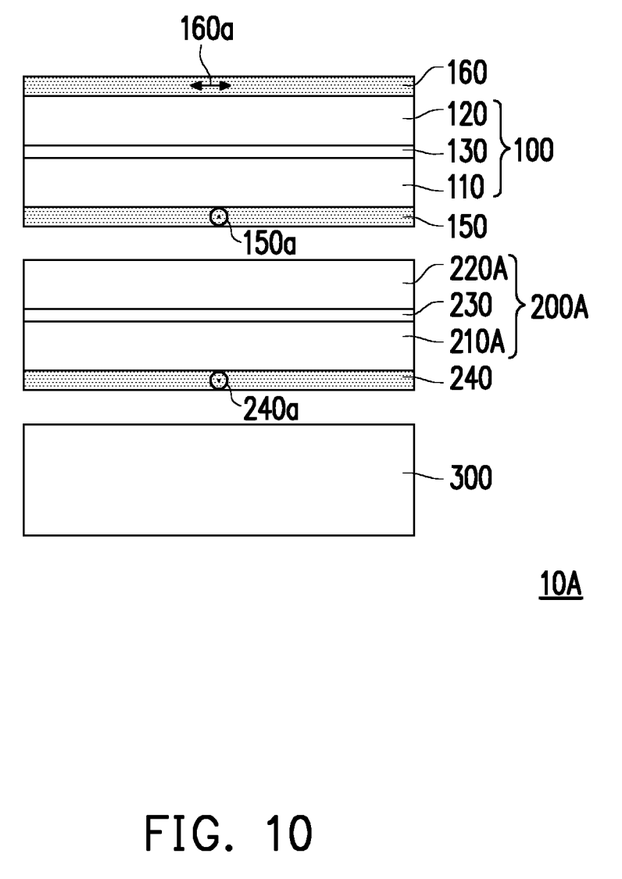
FIG. 10 is a schematic cross-sectional view illustrating a display apparatus 10A according to another embodiment of the invention.

FIG. 10 is a schematic cross-sectional view illustrating a display apparatus 10A according to another embodiment of the invention.

Figure 11:
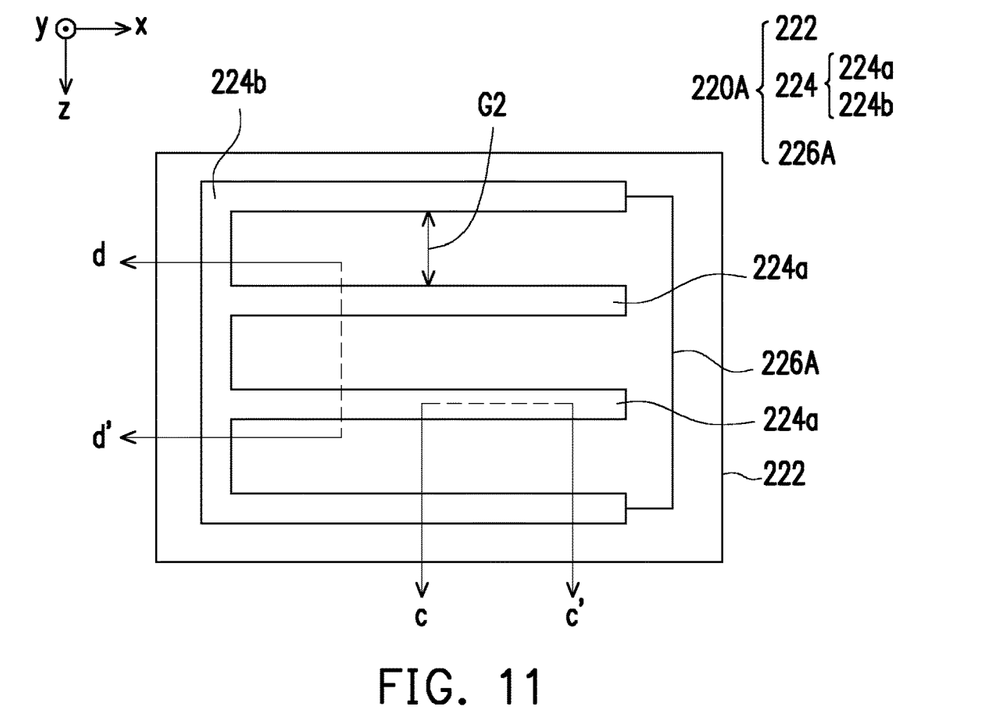
FIG. 11 is a schematic bottom view illustrating a second substrate 220A of a switching panel 200A according to another embodiment of the invention.

FIG. 11 is a schematic bottom view illustrating a second substrate 220A of a switching panel 200A according to another embodiment of the invention.

Figure 12:
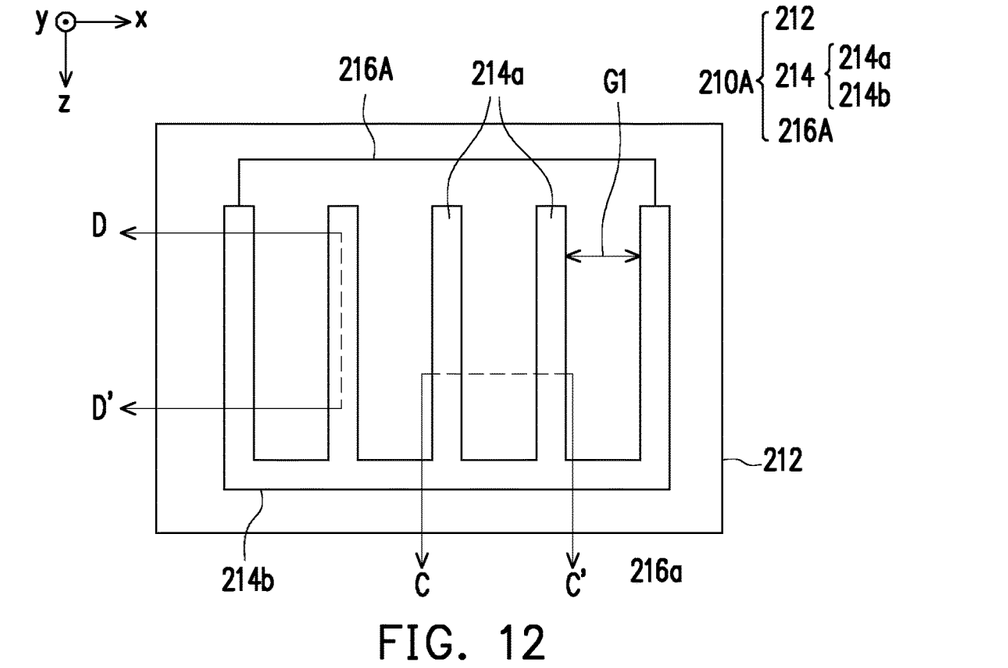
FIG. 12 is a schematic top view illustrating a first substrate 210A of the switching panel 200A according to an embodiment of the invention.

FIG. 12 is a schematic top view illustrating a first substrate 210A of the switching panel 200A according to an embodiment of the invention.

Figure 13:
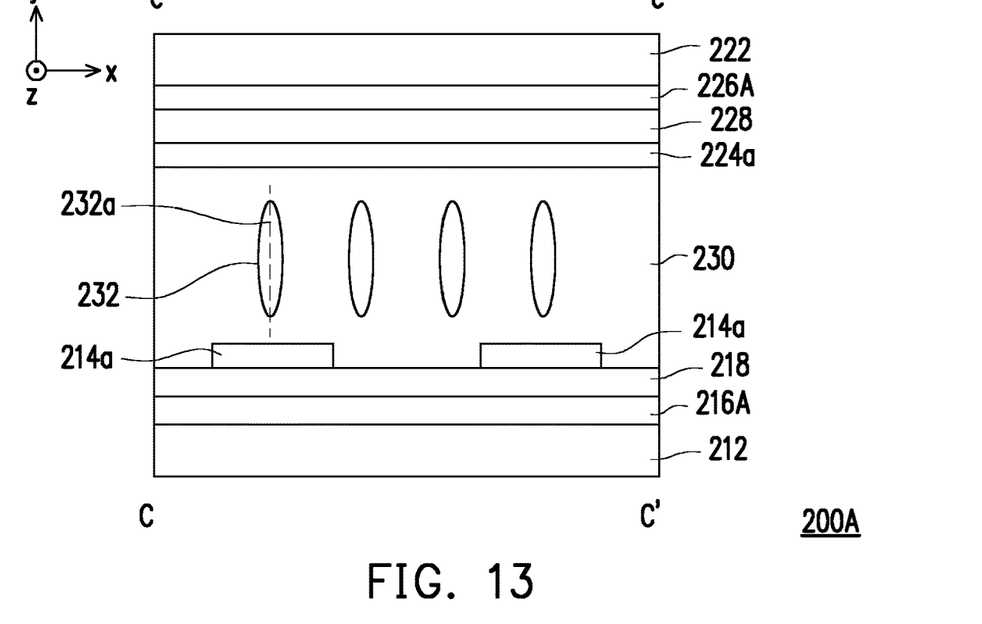
FIG. 13 is a schematic cross-sectional view illustrating the switching panel 200A according to an embodiment of the invention.

FIG. 13 is a schematic cross-sectional view illustrating the switching panel 200A according to an embodiment of the invention. FIG. 13 corresponds to a cross-sectional line c-c' of FIG. 11 and a cross-sectional line C-C' of FIG. 12. In particular, FIG. 13 illustrates the state of the switching panel 200A when the display apparatus 10A is under the sharing mode.

Figure 14:
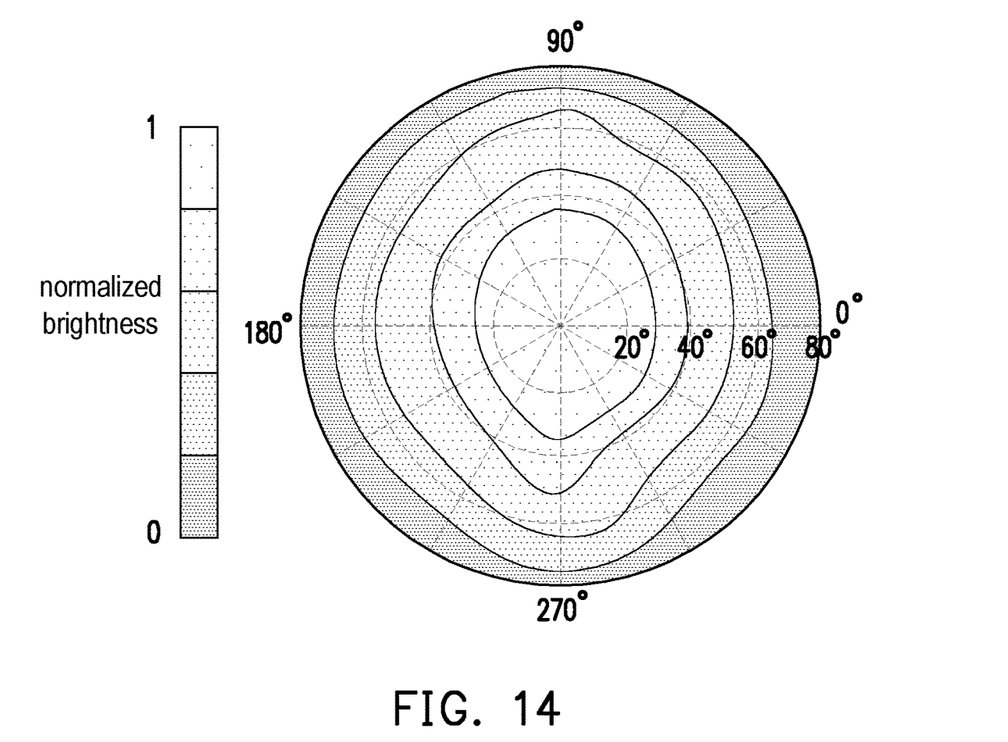
FIG. 14 is a diagram illustrating a relationship between each viewing angle of the display apparatus 10A under the sharing mode and normalized brightness.

FIG. 14 is a diagram illustrating a relationship between each viewing angle of the display apparatus 10A under the sharing mode and normalized brightness.

Figure 15:
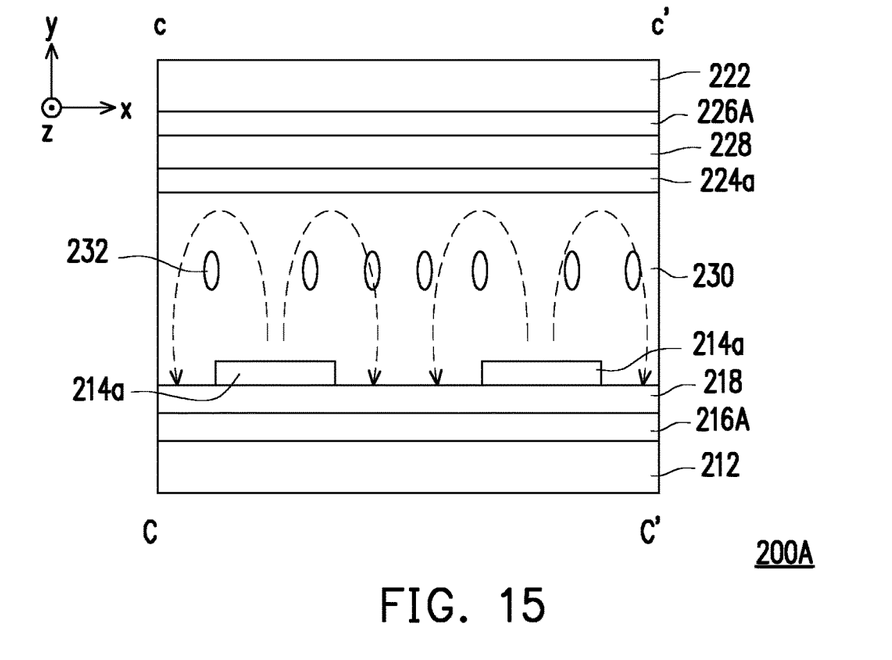
FIG. 15 is a schematic cross-sectional view illustrating the switching panel 200A according to an embodiment of the invention.

FIG. 15 is a schematic cross-sectional view illustrating the switching panel 200A according to an embodiment of the invention. FIG. 15 corresponds to a cross-sectional line c-c' of FIG. 11 and a cross-sectional line C-C' of FIG. 12. In particular, FIG. 15 illustrates the state of the switching panel 200A when the display apparatus 10A is under the second anti-peeping mode.

Figure 16:
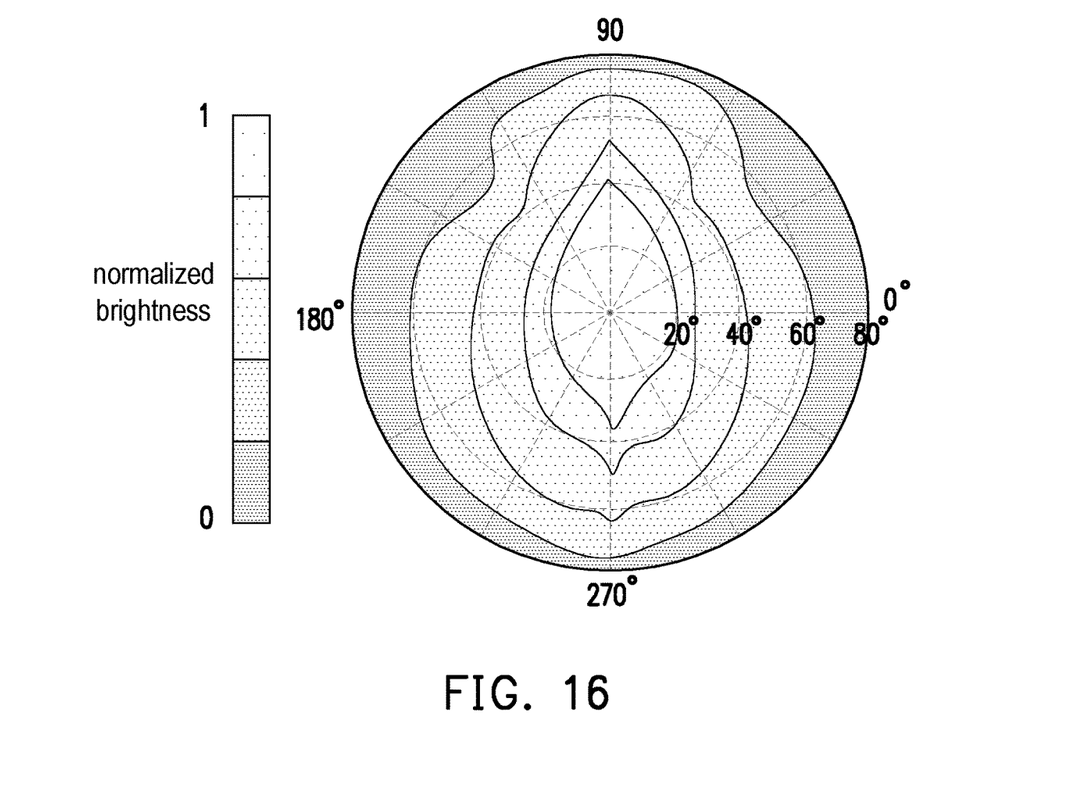
FIG. 16 is a diagram illustrating a relationship between each viewing angle of the display apparatus 10A under the second anti-peeping mode and normalized brightness.

FIG. 16 is a diagram illustrating a relationship between each viewing angle of the display apparatus 10A under the second anti-peeping mode and normalized brightness.

Figure 17:
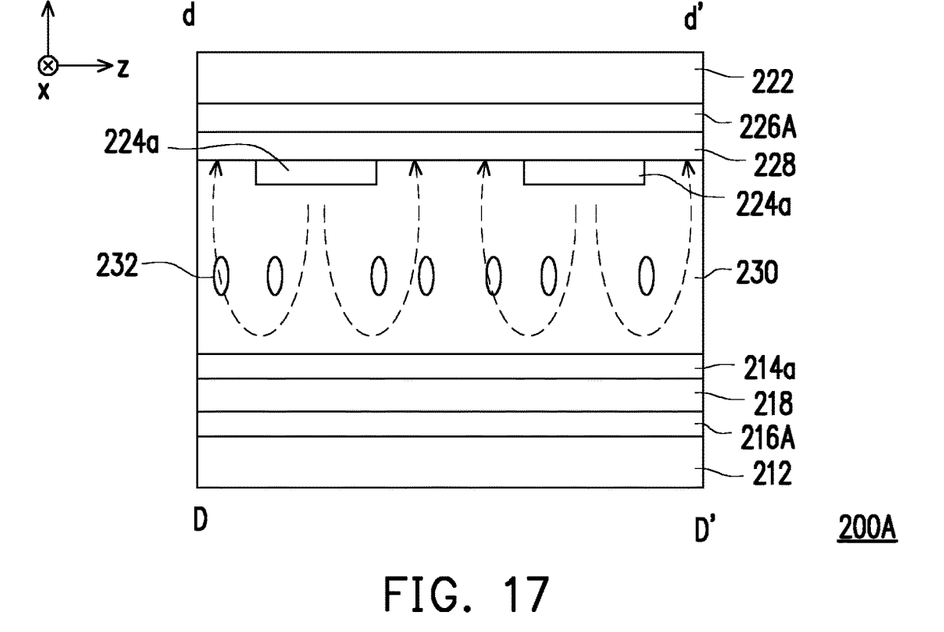
FIG. 17 is a schematic cross-sectional view illustrating the switching panel 200A according to another embodiment of the invention.

FIG. 17 is a schematic cross-sectional view illustrating the switching panel 200A according to another embodiment of the invention. FIG. 17 corresponds to a cross-sectional line d-d' of FIG. 11 and a cross-sectional line D-D' of FIG. 12. In particular, FIG. 17 illustrates the state of the switching panel 200A when the display apparatus 10A is under the first anti-peeping mode.

Figure 18:
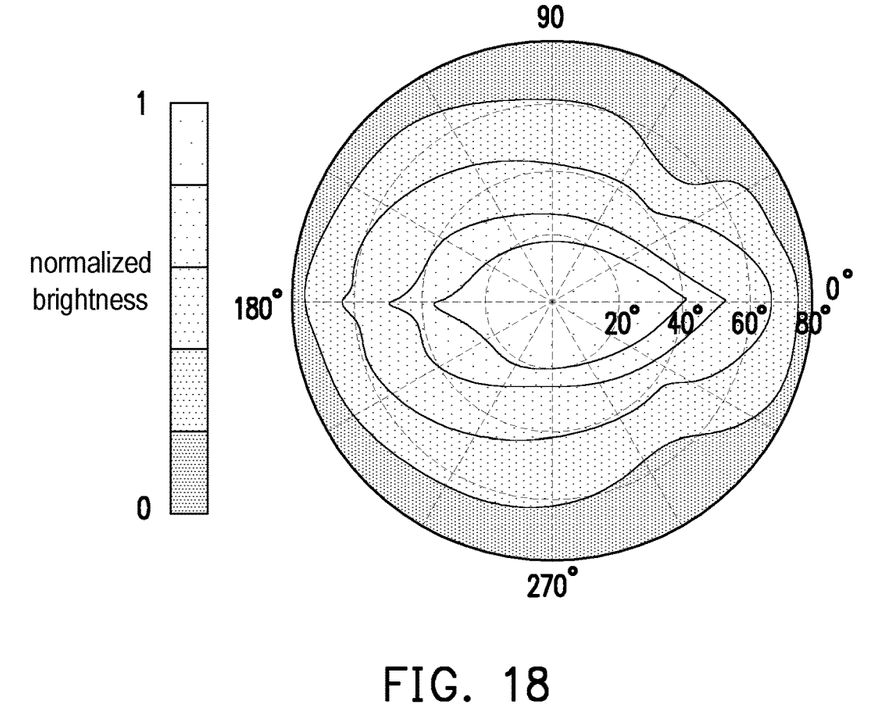
FIG. 18 is a diagram illustrating a relationship between each viewing angle of the display apparatus 10A under the first anti-peeping mode and normalized brightness.

FIG. 18 is a diagram illustrating a relationship between each viewing angle of the display apparatus 10A under the first anti-peeping mode and normalized brightness.

For clear illustration, FIGS. 11, 12, 13, 15, and 17 illustrate the first direction x, the second direction z, and the third direction y perpendicular to one another.

Referring to FIG. 10, the display apparatus 10A of the embodiment is similar to the display apparatus 10, but differs in that the switching panel 200A of the display apparatus 10A of the embodiment is different from the switching panel 200 of the display apparatus 10.

Referring to FIGS. 10, 11, 12, and 13, specifically, in the embodiment, a second electrode 216A and a fourth electrode 226A of the switching panel 200A are different from the second electrode 216 and the fourth electrode 226 of the switching panel 200.

Referring to FIGS. 12 and 13, in the embodiment, the second electrode 216A is a complete electrode layer, a first insulating layer 218 is disposed between the first electrode 214 and the second electrode 216A, the second electrode 216A is disposed between the first base 212 and the first insulating layer 218, the first electrode 214 is disposed between the first insulating layer 218 and the liquid crystal layer 230, and the second electrode 216A is overlapped with the branches 214a of the first electrode 214 and at least one gap G1 between the branches 214a of the first electrode 214.

In the embodiment, the first electrode 214 of the first substrate 210 and the second electrode 216A of the first electrode 210 may be formed by different conductive layers and located on different planes. In addition, the first substrate 210 may use the Fringe Field Switching (FFS) mode to drive the liquid crystal layer 230 of the switching panel 200A.

Referring to FIGS. 11 and 13, in the embodiment, the fourth electrode 226A is a complete electrode layer, a second insulating layer 228 is disposed between the third electrode 224 and the fourth electrode 226A, the fourth electrode 226A is disposed between the second base 222 and the second insulating layer 228, the third electrode 224 is disposed between the second insulating layer 228 and the liquid crystal layer 230, and the fourth electrode 226A is overlapped with the branches 224a of the third electrode 224 and at least one gap G2 between the branches 224a of the third electrode 224.

In the embodiment, the third electrode 224 of the second substrate 220 and the fourth electrode 226A of the second electrode 220 may be formed by different conductive layers and located on different planes. In addition, the second substrate 220 may use the Fringe Field Switching (FFS) mode to drive the liquid crystal layer 230 of the switching panel 200A.

Another difference from the switching panel 200 is that, in the embodiment, the liquid crystal molecules 232 of the switching panel are negative liquid crystal molecules.

Referring to FIGS. 10, 11, 12, 13, and 14, when the display apparatus 10A is under the sharing mode, the first electrode 214, the second electrode 216A, the third electrode 224, and the fourth electrode 226A of the switching panel 200A are not turned on. In addition, the long axes 232a of the liquid crystal molecules 232 of the liquid crystal layer 230 are substantially perpendicular to the first base 212. In other words, the liquid crystal molecules 232 of the switching panel 200A are vertically aligned.

Referring to FIGS. 10, 11, 12, 15, and 16, when the display apparatus 10A is under the second anti-peeping mode, a potential difference is present between the first electrode 214 and the second electrode 216A, and the potential difference between the first electrode 214 and the second electrode 216A is greater than a potential difference between the third electrode 224 and the second electrode 216A and a potential difference between the fourth electrode 226A and the second electrode 216A. For example, in the embodiment, the first electrode 214 has an AC signal with an amplitude of 8V, the second electrode 216A has a DC signal of 0V, the third electrode 224 has an AC signal with an amplitude of 4.4V, and the fourth electrode 226A has an AC signal with an amplitude of 4V. Accordingly, the potential difference (e.g., 8V) between the first electrode 214 and the second electrode 216A is greater than the potential difference (e.g., 4.4V) between the third electrode 224 and the second electrode 216A and the potential difference (e.g., 4V) between the fourth electrode 226A and the second electrode 216A. However, the invention is not limited thereto.

Alternatively, when the display apparatus 10A is under the second anti-peeping mode, a potential difference is present between the first electrode 214 and the second electrode 216A, and the third electrode 224 and the fourth electrode 226A are floating. For example, in another embodiment, when the display apparatus 10A is under the second anti-peeping mode, the first electrode 214 has an AC signal with an amplitude of 8V, the second electrode 216 has a DC signal of 0V, a potential difference of 8V is present between the first electrode 214 and the second electrode 216A, and the third electrode 224 and the fourth electrode 226A have a floating potential. However, the invention is not limited thereto.

Referring to FIGS. 10, 11, 12, 17, and 18, when the display apparatus 10A is under the first anti-peeping mode, the potential difference between the third electrode 224 and the fourth electrode 226A is greater than the potential difference between the first electrode 214 and the fourth electrode 226A and the potential difference between the second electrode 216A and the fourth electrode 226A. For example, in the embodiment, when the display apparatus 10A is under the first anti-peeping mode, the third electrode 224 has an AC signal with an amplitude of 8V, the fourth electrode 226A has a DC signal of 0V, the first electrode 214 has an AC signal with an amplitude of 4.4V, and the second electrode 216A has an AC signal with an amplitude of 4V. Accordingly, the potential difference (e.g., 8V) between the third electrode 224 and the fourth electrode 226A is greater than the potential difference (e.g., 4.4V) between the first electrode 214 and the fourth electrode 226A and the potential difference (e.g., 4V) between the second electrode 216A and the fourth electrode 226A. However, the invention is not limited thereto.

Alternatively, when the display apparatus 10A is under the first anti-peeping mode, a potential difference is present between the third electrode 224 and the fourth electrode 226A, and the first electrode 214 and the second electrode 216A are floating. For example, in another embodiment, when the display apparatus 10A is under the first anti-peeping mode, the third electrode 224 has an AC signal with an amplitude of 8V, the fourth electrode 226A has a DC signal of 0V, a potential difference of 8V is present between the third electrode 224 and the fourth electrode 226A, and the first electrode 214 and the second electrode 216A have a floating potential. However, the invention is not limited thereto.

Figure 19:
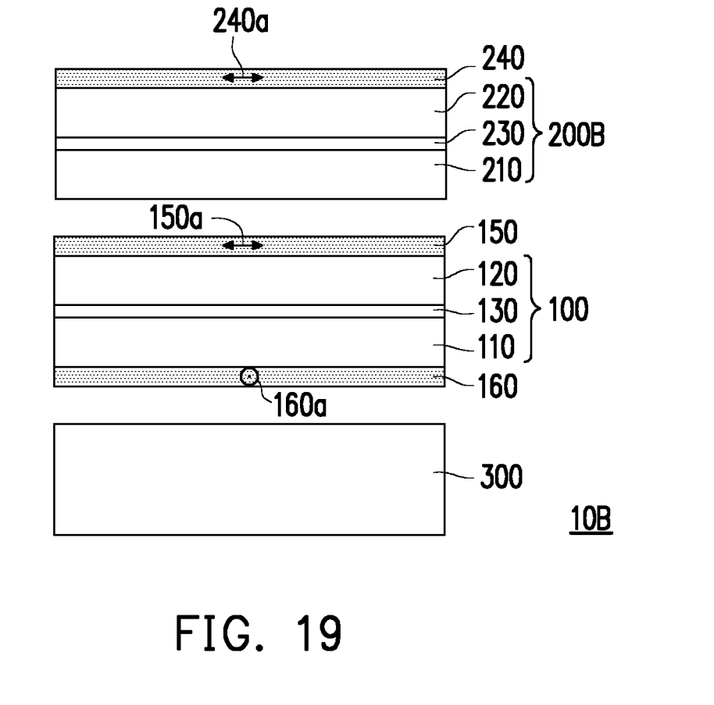
FIG. 19 is a schematic cross-sectional view illustrating a display apparatus 10B according to still another embodiment of the invention.

FIG. 19 is a schematic cross-sectional view illustrating a display apparatus 10B according to still another embodiment of the invention. The display apparatus 10B of FIG. 19 is similar to the display apparatus 10, but differs in that, in the embodiment of FIG. 19, the display panel 100 is located between the switching panel 200 and the backlight module 300. In other words, the switching panel 200 may also be disposed on the display panel 100.

Figure 20:
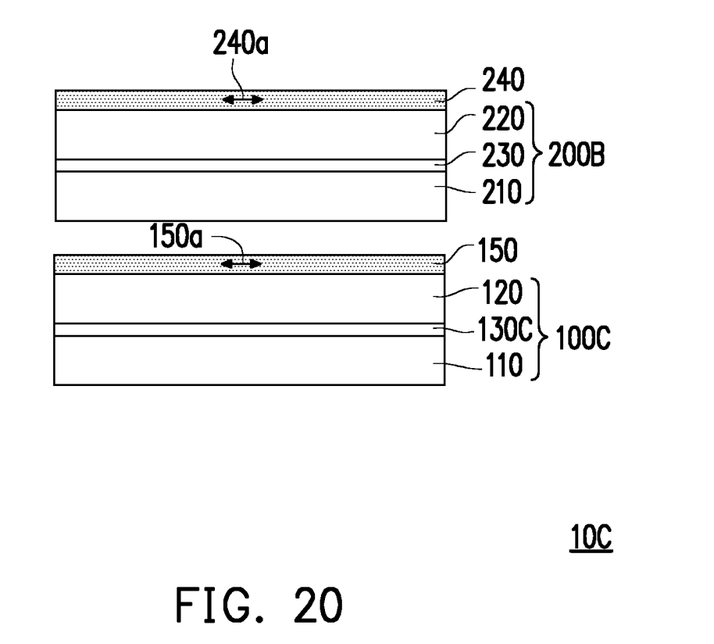
FIG. 20 is a schematic cross-sectional view illustrating a display apparatus 10C according to yet another embodiment of the invention.

FIG. 20 is a schematic cross-sectional view illustrating a display apparatus 10C according to yet another embodiment of the invention. The display apparatus 10C of FIG. 20 is similar to the display apparatus 10 of FIG. 1, but differs in that, in the embodiment of FIG. 20, a display medium 130C of the display panel 100C may be a self-emissive display medium, including, but not limited to, an organic light emitting diode (OLED) or a micro light emitting diode (μLED). In the display apparatus 10C, the backlight module 300 may be omitted, and the switching panel 200 may be disposed on the display panel 100C.

The first electrode 214, the second electrode 216 or 216A, the third electrode 224, and the fourth electrode 226 or 226A may be considered as a switching electrode set. In the respective embodiments, an example in which the switching panel 200 or 200A includes one switching electrode set is described. However, the invention is not limited thereto. The switching panel 200 or 200a may also include a plurality of switching electrode sets respectively overlapped with a plurality of display regions of the display panel 100 or 100C, so that the user can determine whether each display region is under anti-peeping protection and/or the anti-peeping direction of each display region.

In view of the foregoing, the display apparatus according to the embodiments of the invention includes the display panel and the switching panel disposed outside the display panel. The first substrate of the switching panel has the first electrode and the second electrode. The second substrate of the switching panel has the third electrode and the fourth electrode. Specifically, the arrangement direction of the branches of the first electrode of the first substrate is interlaced with the arrangement direction of the branches of the third electrode of the second substrate. Accordingly, the switching panel allows the display apparatus to switch to the first anti-peeing mode or the second anti-peeing mode, so that the user can choose the anti-peeping direction based on the occasion and/or manner of use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display apparatus, comprising:
a display panel; and
a switching panel, disposed outside the display panel and comprising:
    a first base;
    a first electrode and a second electrode, disposed on the first base, wherein the first electrode has a plurality of branches, and the branches of the first electrode are arranged along a first direction with each other;
    a second base, disposed opposite to the first base;
    a third electrode and a fourth electrode, disposed on the second base, wherein the third electrode has a plurality of branches, the branches of the third electrode are arranged along a second direction with each other, the branches of the third electrode are connected, and the first direction is substantially perpendicular to the second direction; and a liquid crystal layer, disposed between the first base and the second base, wherein when the display apparatus is under a sharing mode, the first electrode, the second electrode, the third electrode, and the fourth electrode are not turned on, and long axes of a plurality of liquid crystal molecules of the liquid crystal layer are substantially perpendicular to the first base.

2. The display apparatus as claimed in claim 1, wherein when the display apparatus is under a first anti-peeping mode, a potential difference between the first electrode and the second electrode is greater than a potential difference between the third electrode and the second electrode and a potential difference between the fourth electrode and the second electrode, or when the display apparatus is under the first anti-peeping mode, a potential difference is present between the first electrode and the second electrode, and the third electrode and the fourth electrode are floating.

3. The display apparatus as claimed in claim 2, wherein when the display apparatus is under a second anti-peeping mode, a potential difference between the third electrode and the fourth electrode is greater than a potential difference between the first electrode and the fourth electrode and a potential difference between the second electrode and the fourth electrode.

4. The display apparatus as claimed in claim 2, wherein when the display apparatus is under a second anti-peeping mode, a potential difference is present between the third electrode and the fourth electrode, and the first electrode and the second electrode are floating.

5. The display apparatus as claimed in claim 1, wherein the second electrode has a plurality of branches, and the branches of the first electrode and the branches of the second electrode are alternately arranged in the first direction.

6. The display apparatus as claimed in claim 5, wherein the fourth electrode has a plurality of branches, and the branches of the third electrode and the branches of the fourth electrode are alternately arranged in the second direction.

7. The display apparatus as claimed in claim 1, wherein the switching panel further comprises:

a first insulating layer, disposed between the first electrode and the second electrode, wherein the second electrode is disposed between the first base and the first insulating layer, the first electrode is disposed between the first insulating layer and the liquid crystal layer, and the second electrode is overlapped with the branches of the first electrode and at least one gap between the branches of the first electrode.

8. The display apparatus as claimed in claim 7, wherein the switching panel further comprises:

a second insulating layer, disposed between the third electrode and the fourth electrode, wherein the fourth electrode is disposed between the second base and the second insulating layer, the third electrode is disposed between the second insulating layer and the liquid crystal layer, and the fourth electrode is overlapped with the branches of the third electrode and at least one gap between the branches of the third electrode.

9. The display apparatus as claimed in claim 1, wherein one of the branches of the first electrode and one of the branches of the third electrode form an included angle θ, and 80°≤θ≤1000°.

* * * * *